(12) United States Patent
Kinoshita et al.

(10) Patent No.: US 10,076,994 B2
(45) Date of Patent: Sep. 18, 2018

(54) VEHICLE LAMP

(71) Applicant: Stanley Electric Co., Ltd., Tokyo (JP)

(72) Inventors: Kayuri Kinoshita, Tokyo (JP); Hisashi Furuya, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/487,651

(22) Filed: Apr. 14, 2017

(65) Prior Publication Data
US 2017/0299137 A1 Oct. 19, 2017

(30) Foreign Application Priority Data
Apr. 19, 2016 (JP) .................. 2016-083576

(51) Int. Cl.
*B60Q 1/14* (2006.01)
*F21S 41/147* (2018.01)
(Continued)

(52) U.S. Cl.
CPC .......... *B60Q 1/1423* (2013.01); *F21S 41/147* (2018.01); *F21S 41/255* (2018.01); *F21S 41/265* (2018.01); *F21S 41/27* (2018.01); *F21S 41/275* (2018.01); *F21S 41/36* (2018.01); *F21S 41/39* (2018.01); *F21S 41/40* (2018.01); *F21S 41/43* (2018.01); *F21S 41/60* (2018.01); *F21S 41/663* (2018.01); *F21S 41/365* (2018.01)

(58) Field of Classification Search
CPC .... F21S 48/1291; F21S 48/1159; F21S 41/27; F21S 41/147
See application file for complete search history.

(56) References Cited

U.S. PATENT DOCUMENTS 6,575,610 B2 * 6/2003 Natsume ................. F21S 43/26
362/520
2001/0019486 A1 * 9/2001 Thominet ............ F21S 48/1131
362/543

(Continued)

FOREIGN PATENT DOCUMENTS

DE 102009008631 A1 8/2010
DE 102011004086 A1 8/2012
(Continued)

OTHER PUBLICATIONS

The extended European Search Report for the related European Patent Application No. 17166866.8 dated Aug. 28, 2017.

*Primary Examiner* — William N Harris
(74) *Attorney, Agent, or Firm* — Kenealy Vaidya LLP

(57) ABSTRACT

A vehicle lamp includes a first light source configured to emit first light, a first reflective member configured to reflect the first light downward with respect to a vehicle advancing direction, a second reflective member configured to reflect some of the first light reflected by the first reflective member upward with respect to the vehicle advancing direction, a second light source disposed below the second reflective member and configured to emit second light in the vehicle advancing direction, and a projection lens configured to project the first light and the second light in the vehicle advancing direction, wherein the projection lens has a refracting surface configured to refract at least some of the second light downward than an optical axis of the second light.

7 Claims, 6 Drawing Sheets

(51) Int. Cl.
*F21S 41/255* (2018.01)
*F21S 41/265* (2018.01)
*F21S 41/275* (2018.01)
*F21S 41/27* (2018.01)
*F21S 41/39* (2018.01)
*F21S 41/36* (2018.01)
*F21S 41/40* (2018.01)
*F21S 41/43* (2018.01)
*F21S 41/60* (2018.01)
*F21S 41/663* (2018.01)
*F21S 41/365* (2018.01)

(56) References Cited

U.S. PATENT DOCUMENTS

| | | | |
|---|---|---|---|
| 2006/0120094 A1 | 6/2006 | Tsukamoto et al. | |
| 2009/0310377 A1* | 12/2009 | Kanai | F21S 48/1159 362/538 |
| 2010/0226142 A1 | 9/2010 | Brendle et al. | |
| 2013/0027961 A1* | 1/2013 | Ugajin | F21S 41/143 362/538 |
| 2014/0092619 A1* | 4/2014 | Bushre | B60Q 1/20 362/520 |
| 2016/0025291 A1* | 1/2016 | Iwasaki | F21S 41/143 362/516 |
| 2017/0067610 A1* | 3/2017 | Lo | F21S 48/1283 |
| 2017/0152999 A1* | 6/2017 | Haberkorn | F21S 48/1159 |
| 2017/0184268 A1* | 6/2017 | Kanayama | F21V 29/503 |
| 2017/0198877 A1* | 7/2017 | Suwa | F21S 48/1291 |
| 2017/0227184 A1* | 8/2017 | Ishida | F21S 48/1747 |

FOREIGN PATENT DOCUMENTS

| | | |
|---|---|---|
| EP | 2431658 A2 | 3/2012 |
| JP | 2006-164735 A | 6/2006 |
| JP | 2014-120342 A | 6/2014 |
| WO | 2016021698 A1 | 2/2016 |

\* cited by examiner

VEHICLE LAMP

CROSS-REFERENCE TO RELATED APPLICATION

Priority is claimed on Japanese Patent Application No. 2016-083576, filed Apr. 19, 2016, the contents of which are incorporated herein by reference.

BACKGROUND

Field of the Invention

The present invention relates to a vehicle lamp.

Description of Related Art

For example, a vehicle lamp such as a headlight for a vehicle (a head lamp) or the like includes a light source, a reflector configured to reflect light emitted from a light source in a vehicle advancing direction, a shade configured to shield (cut) some of the light reflected by the reflector, and a projection lens configured to project the light that is partially cut by the shade in the vehicle advancing direction. In such a vehicle lamp, a light distribution pattern for a low beam including a cutoff line at an upper end is formed as a passing beam (a low beam) by reversely projecting a light source image defined by a front end of a shade with a projection lens.

In addition, in the vehicle lamp, as another light source configured to emit light in the vehicle advancing direction is disposed below the shade and light emitted from the light source is projected by the projection lens as a driving beam (high beam), a light distribution pattern for a high beam is formed above the light distribution pattern for the low beam (for example, see Japanese Unexamined Patent Application, First Publication No. 2006-164735).

Further, recently, development of an adaptive driving beam (ADB) head lamp configured to variably control a light distribution of the light distribution pattern for a high beam has also advanced due to disposing light emitting elements such as light emitting diodes (LEDs) or the like in parallel and switching lighting of the light emitting elements. The ADB is a technology for allowing recognition of preceding cars, oncoming cars, pedestrians, or the like, using an on-vehicle camera and enlarging a front visual field of a driver at nighttime without applying glare to a driver in oncoming cars or pedestrians.

SUMMARY

Incidentally, when the passing beam (the low beam) and the driving beam (the high beam) are projected by the same projection lens, for example, as shown in FIG. 9, there is a case in which a dark region (a region in which no light is radiated) B corresponding to a thickness of the shade is generated between a cutoff line CL' of a light distribution pattern P1' for a low beam and a light distribution pattern P2' for a high beam. In this case, it is difficult to obtain a satisfactory light distribution pattern.

An aspect of the present invention is directed to providing a vehicle lamp capable of obtaining a satisfactory light distribution pattern.

The present invention employs the following configurations.

(1) According to an aspect of the present invention, there is provided a vehicle lamp including: a first light source configured to emit first light; a first reflective member configured to reflect the first light downward with respect to a vehicle advancing direction; a second reflective member configured to reflect some of the first light reflected by the first reflective member upward with respect to the vehicle advancing direction; a second light source disposed below the second reflective member and configured to emit second light in the vehicle advancing direction; and a projection lens configured to project the first light and the second light in the vehicle advancing direction, wherein the projection lens has a refracting surface configured to refract at least some of the second light downward than an optical axis of the second light, the first light projected by the projection lens forms a first light distribution pattern including a cutoff line defined by a front end of the second reflective member at an upper end of the first light distribution pattern, and the second light projected by the projection lens forms a second light distribution pattern that is disposed above the first light distribution pattern and that partially overlaps the cutoff line due to the light refracted downward by the refracting surface.

(2) In the aspect of (1), among the projection lens, the refracting surface may be disposed in an intermediate region between a lower region in which first light reflected downward with respect to the vehicle advancing direction by the first reflective member passes and an upper region in which first light reflected upward with respect to the vehicle advancing direction by the second reflective member passes.

(3) In the aspect of (1) or (2), the projection lens may have a light diffusion section configured to diffuse light entering the refracting surface.

(4) In the aspect of any one of (1) to (3), the projection lens may have a diffracting surface configured to diffract at least some of the first light upward than the optical axis of the first light, and the light diffracted by the diffracting surface may form a third light distribution pattern above the cutoff line.

(5) In the aspect of (4), the diffracting surface may be disposed in a peripheral region of the projection lens other than a center of the projection lens.

(6) In the aspect of (4) or (5), the projection lens may have a configuration in which a first lens including the refracting surface and a second lens including the diffracting surface are sequentially disposed in parallel in a direction opposite to the vehicle advancing direction.

(7) In the aspect of any one of (1) to (6), the second light source may have a plurality of light emitting elements, and a light distribution of the second light distribution pattern may be variably controlled by switching lighting of the plurality of light emitting elements.

According to the aspects of the present invention, it is possible to provide a vehicle lamp capable of obtaining a light distribution pattern having satisfactory quality.

DESCRIPTION OF EMBODIMENTS

Figure 1:
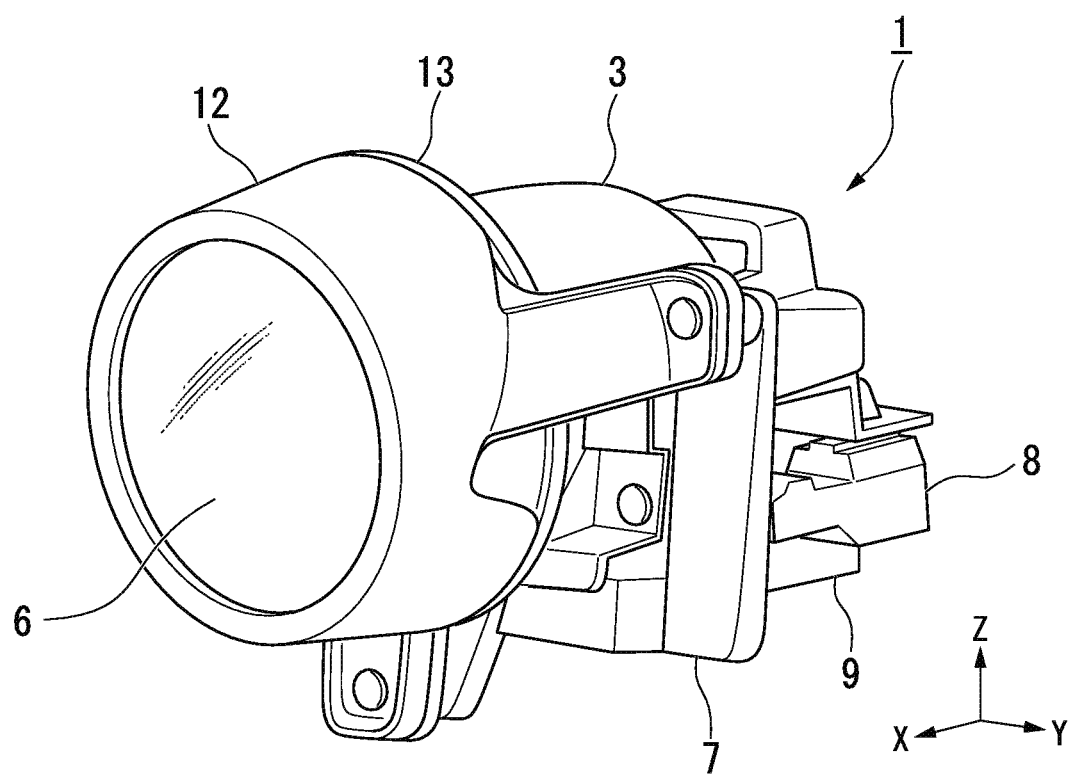
FIG. 1 is a perspective view showing an appearance of a vehicle lamp according to a first embodiment of the present invention.

Hereinafter, embodiments of the present invention will be described in detail with reference to the accompanying drawings.

Further, in the drawings used in the following description, in order to make components easier to see, dimensional scales may be different depending on the components, and dimensional ratios between components are not necessarily the same as in reality.

First Embodiment

Figure 2:
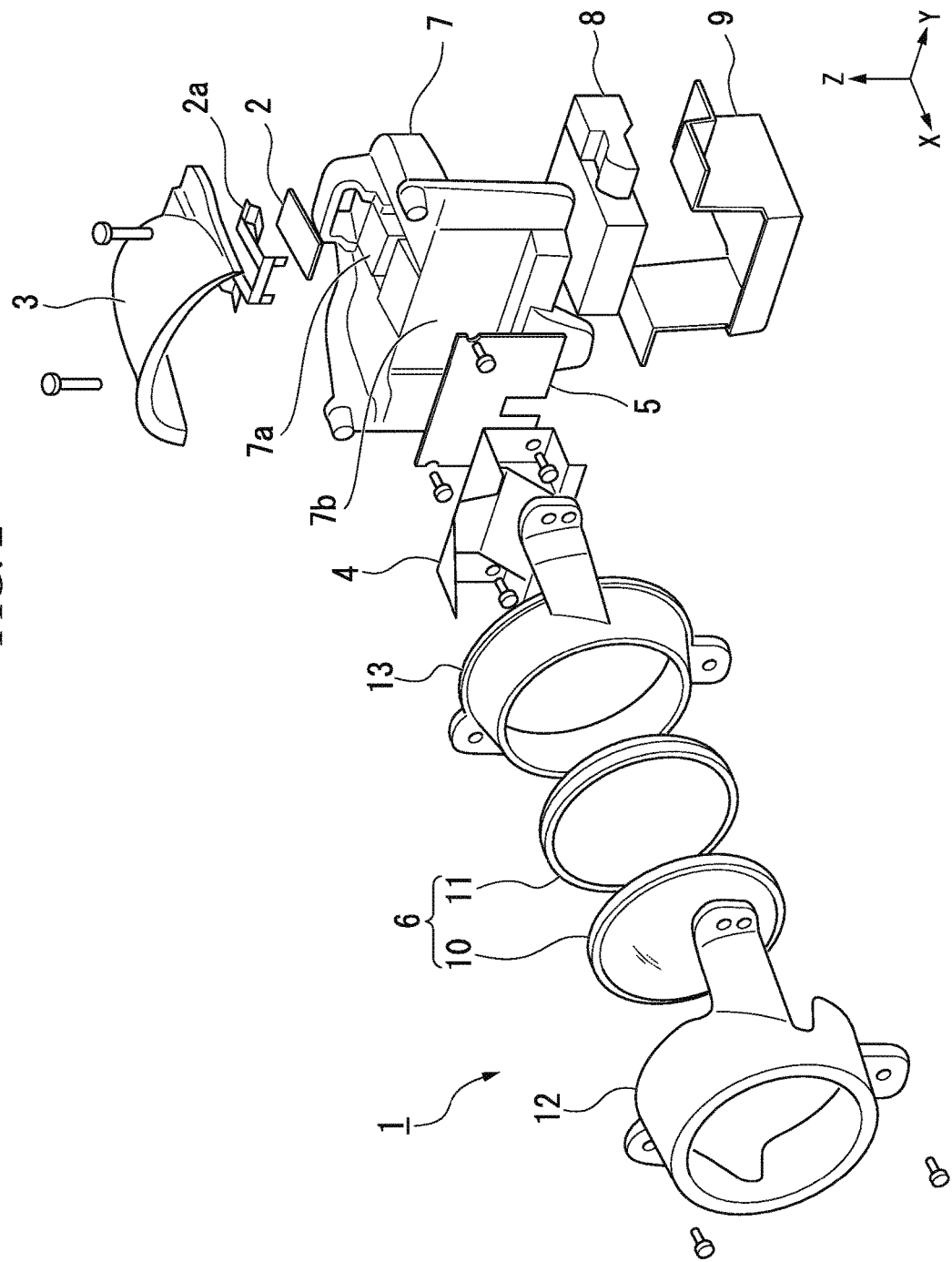
FIG. 2 is an exploded perspective view showing a configuration of the vehicle lamp shown in FIG. 1.
Figure 3:
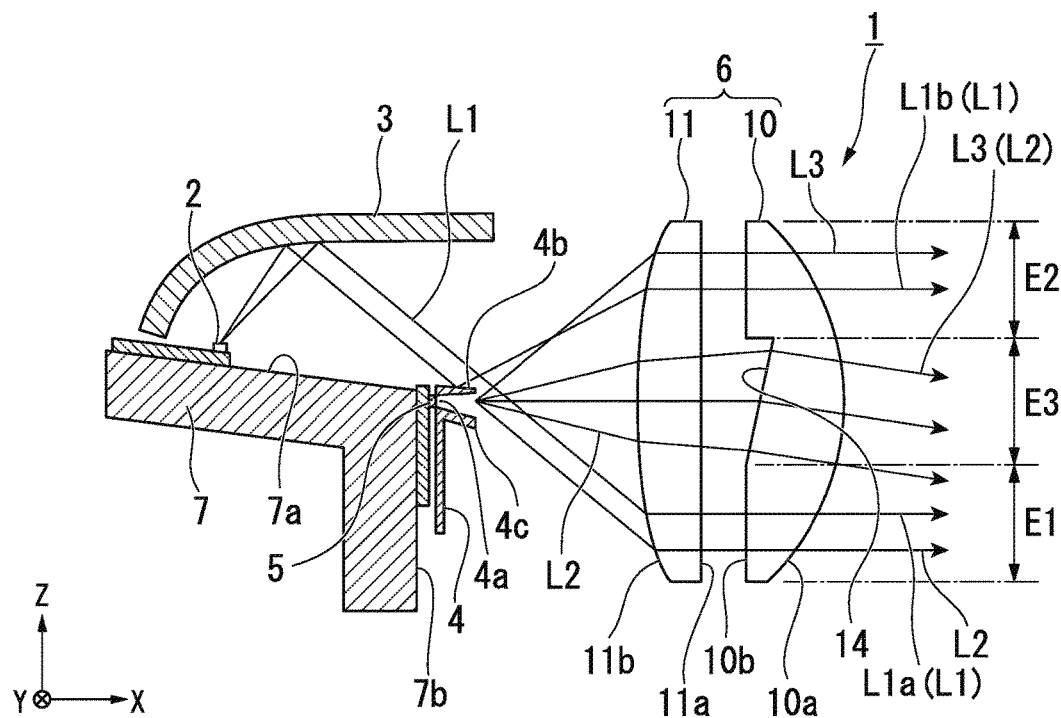
FIG. 3 is a cross-sectional view showing a configuration of the vehicle lamp shown in FIG. 1.

For example, a vehicle lamp 1 shown in FIG. 1 to FIG. 3 will be described as a first embodiment of the present invention. Further, FIG. 1 is a perspective view showing an appearance of the vehicle lamp 1. FIG. 2 is an exploded perspective view showing a configuration of the vehicle lamp 1 shown in FIG. 1. FIG. 3 is a cross-sectional view showing a configuration of the vehicle lamp 1 shown in FIG. 1. In addition, in the following drawings, an XYZ orthogonal coordinate system is set, an X-axis direction is referred to as a forward/rearward direction in the vehicle lamp 1, a Y-axis direction is referred to as a leftward/rightward direction in the vehicle lamp 1, and a Z-axis direction is referred to as an upward/downward direction in the vehicle lamp 1.

The vehicle lamp 1 of the embodiment is a headlight for a vehicle (a headlight) configured to radiate a passing beam (a low beam) and a driving beam (a high beam) in a vehicle advancing direction. In addition, the vehicle lamp 1 is an adaptive driving beam (ADB) head lamp configured to variably control a light distribution of the driving beam (the high beam).

Specifically, the vehicle lamp 1 includes a light source unit (a first light source) 2 for a low beam (LB), a reflector (a first reflective member) 3, a separator (a second reflective member) 4, a light source unit (a second light source) 5 for ADB and a projection lens 6. These are integrally attached to a casing 7 serving as a heat sink. In addition, a cooling fan 8 is attached to the casing 7 via a housing 9.

In the vehicle lamp 1, the light source units 2 and 5 are cooled by radiating heat generated by the light source units 2 and 5 from the casing (the heat sink) 7 while blowing air using the cooling fan 8.

The light source unit 2 for LB is a first light source configured to emit first light L1 serving as a passing beam (a low beam). An LED module in which LEDs are mounted in a package is used for the light source unit 2 for LB. In addition, LEDs configured to emit white light are used in the LED module. Further, a high output type vehicle lighting element is used in the LED.

The light source unit 2 for LB is attached to an upper surface 7a of the casing 7 with thermal conductive grease (not shown) therebetween while being held by a light source holder 2a. Accordingly, the light source unit 2 for LB radially emits the first light L1 upward (in a +Z-axis direction).

Further, in addition to the above-mentioned LED, a light emitting element such as a laser diode (LD) or the like can be used in the light source unit 2 for LB. In addition, in addition to the above-mentioned light emitting elements, another light source may be used. Further, the number of the light emitting elements is not limited to 1 and may be plural.

The reflector 3 serving as a first reflective member is constituted by a reflective member such as an aluminum die casting or the like. The reflector 3 is attached to the upper surface 7a of the casing 7 and covers an upper side of the light source unit 2 for LB. In a cross section (an X-axis cross section) along a forward/rearward direction (an X-axis direction) of the vehicle, the reflector 3 is curved from a base end (a rear end) side toward a tip (a front end) side so as to form a parabola in which a center (a light emitting point) of the light source unit 2 for LB is used as a focus. In the reflector 3, a surface (an inner surface) opposite to the light source unit 2 for LB is set as a reflective surface. In the reflector 3, the first light L1 emitted from the light source unit 2 for LB is reflected in the vehicle advancing direction (a +X-axis direction) by the reflective surface.

The separator 4 serving as a second reflective member is constituted by a reflective member such as an aluminum die casting or the like. The separator 4 has an opening section 4a that allows the light source unit for ADB (the second light source) 5 to face forward, an upper shade 4b protruding forward from a position along an upper end of the opening section 4a, and a lower shade 4c protruding forward from a position along a lower end of the opening section. The separator 4 is attached to a front surface 7b of the casing 7 such that the upper shade 4b is disposed in front of the upper surface 7a of the casing 7.

Accordingly, in the separator 4, an upper surface of the upper shade 4b reflects some of the first light L1 reflected by the reflector 3 upward with respect to the vehicle advancing direction (obliquely upward with respect to the vehicle advancing direction). In addition, a lower surface of the upper shade 4b and an upper surface of the lower shade 4c reflect second light L2 emitted from the light source unit 5 for ADB through the opening section 4a toward the projection lens 6.

The light source unit 5 for ADB is a second light source configured to emit second light L2 serving as a beam for ADB (a high beam). The light source unit 2 for LB can variably control light distribution of a light distribution pattern P2 for ADB, which will be described below, by disposing a plurality of LEDs (light emitting elements) in parallel configured to emit white light and switching lighting of the each LEDs.

The light source unit 5 for ADB is attached to the front surface 7b of the casing 7 with thermal conductive grease (not shown) therebetween such that the plurality of LEDs are arranged at positions facing a front side from the opening section 4a of the separator 4. Further, in the plurality of light emitting elements that constitute the light source unit 5 for ADB, in addition to the above-mentioned LEDs, a light emitting element such as a laser diode (LD) or the like may be used.

In the projection lens 6, a first lens 10 and a second lens 11 are sequentially disposed in parallel to constitute a compound lens in a direction (an −X-axis direction) opposite to the vehicle advancing direction. Among those, the first lens 10 has a front surface 10a that is a lens surface (a convex surface), and a rear surface 10b that is a planar surface. Meanwhile, the second lens 11 has a front surface 11a that is a planar surface, and a rear surface 11b that is a lens surface (a convex surface).

In a state in which the first lens 10 and the second lens 11 are disposed between a retainer 12 of a front surface side and a lens holder 13 of a rear surface side, the first lens 10 and the second lens 11 are integrally disposed as the projection lens 6 while having there outer circumferential sections held by the retainer 12 and the lens holder 13. In addition, the projection lens 6 is disposed in front of the reflector 3 and the separator 4 by attaching the retainer 12 and the lens holder 13 to the front surface 7b of the casing 7. The projection lens 6 enlarges and projects the first light L1 and the second light L2 in the vehicle advancing direction (the +X-axis direction).

The projection lens 6 has a refracting surface 14 at the rear surface 10b of the first lens 10. Among the projection lens 6, the refracting surface 14 is disposed in an intermediate region E3 between a lower region E1 through which the first light L1a (L1) reflected downward with respect to the vehicle advancing direction (obliquely downward with respect to the vehicle advancing direction) by the reflector 3 passes and an upper region E2 through which the first light L1b (L1) reflected upward with respect to the vehicle advancing direction (obliquely upward with respect to the vehicle advancing direction) by the upper surface of the upper shade 4b passes.

The refracting surface 14 is formed as a forwardly inclined surface by cutting out a portion of the rear surface 10b of the first lens 10 corresponding to the intermediate region E3. Accordingly, the second light L2 entering the refracting surface 14 can be refracted downward than an optical axis of the second light L2 as third light L3.

Figure 4:
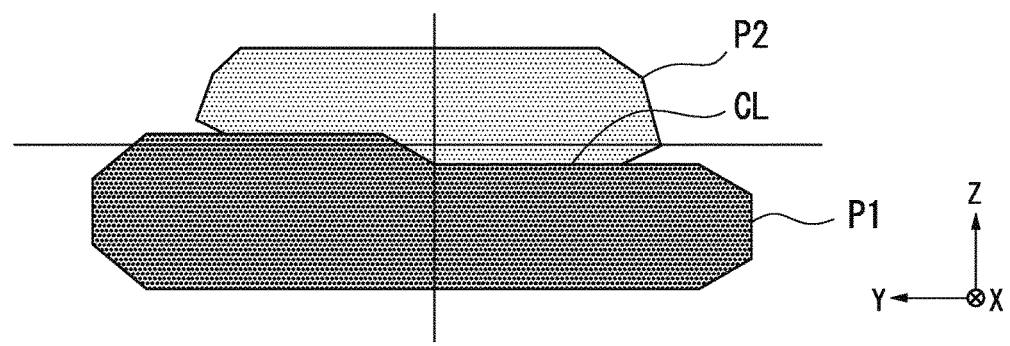
FIG. 4 is a schematic view showing a light distribution pattern formed on a surface of a virtual vertical screen by first light and second light in the vehicle lamp shown in FIG. 1.

In the vehicle lamp 1 having the above-mentioned configuration, a light source image (light distribution patterns P1 and P2 by the first light L1 and the second light L2) when the first light L1 and the second light L2 radiated forward from the projection lens 6 are projected to a virtual vertical screen facing the projection lens 6 is shown in FIG. 4.

The first light L1 projected by the projection lens 6 reversely projects a light source image formed in the vicinity of a rear focus of the projection lens 6 as a passing beam (a low beam) to form the light distribution pattern for a low beam (LB) (a first light distribution pattern) P1 including a cutoff line CL defined by a front end of the upper shade 4b (the separator 4) at the upper end.

Meanwhile, as a beam for ADB (a driving beam), the second light L2 projected by the projection lens 6 forms the light distribution pattern for ADB (the second light distribution pattern) P2 that is disposed above the light distribution pattern P1 for LB and that partially overlaps the cutoff line CL due to the third light L3 refracted downward by the refracting surface 14.

As described above, in the vehicle lamp 1 of the embodiment, it is possible to form the light distribution pattern P2 for ADB that partially overlaps the cutoff line CL at above the light distribution pattern P1 for LB due to the third light L3 being refracted downward by the above-mentioned refracting surface 14.

Accordingly, according to the vehicle lamp 1 of the embodiment, the light distribution patterns P1 and P2 having satisfactory quality can be formed between the light distribution pattern P1 for LB and the light distribution pattern P2 for ADB without generating a dark region (a region in which no light is radiated) according to a thickness of the upper shade 4b (the separator 4).

Second Embodiment

Figure 5:
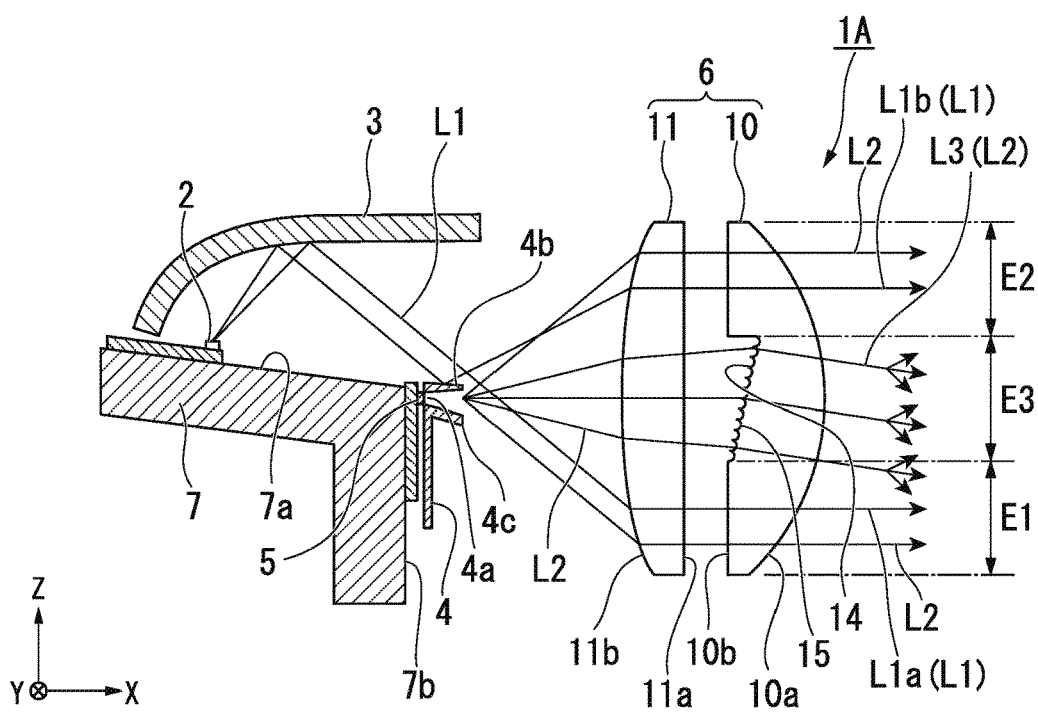
FIG. 5 is a cross-sectional view showing a configuration of a vehicle lamp according to a second embodiment of the present invention.
Figure 6:
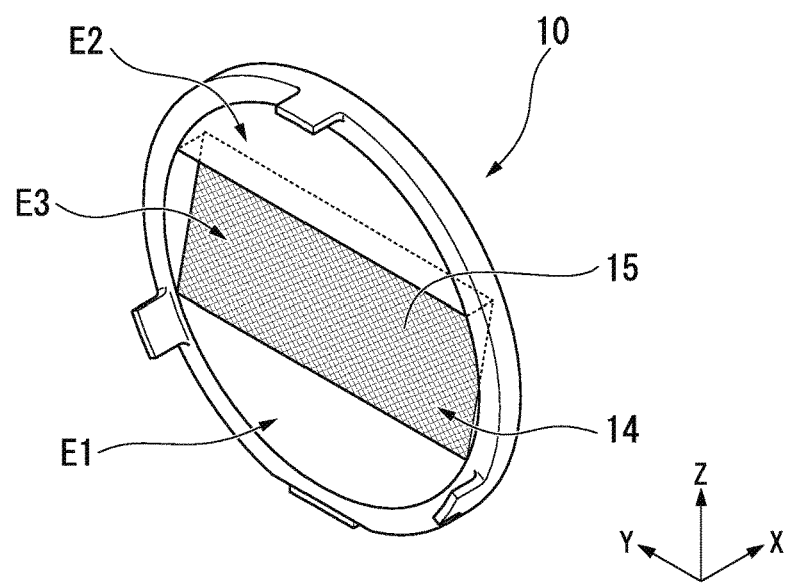
FIG. 6 is a perspective view showing a first lens included in the vehicle lamp shown in FIG. 5 when seen in a rear view.

Subsequently, for example, a vehicle lamp 1A shown in FIG. 5 and FIG. 6 will be described as a second embodiment of the present invention. Further, FIG. 5 is a cross-sectional view showing a configuration of the vehicle lamp 1A. FIG. 6 is a perspective view showing the first lens 10 when seen from the rear surface 10b side. In addition, in the following description, the same parts as the vehicle lamp 1 are designated by the same reference numerals in the drawings, and description thereof will be omitted.

The vehicle lamp 1A of the embodiment has a configuration in which a light diffusion section 15 configured to diffuse the second light L2 entering the refracting surface 14 is provided, in addition to the configuration of the vehicle lamp 1. Specifically, the light diffusion section 15 is constituted by a plurality of convex surfaces formed at the refracting surface 14.

Further, in the embodiment, due to the convenience of mold forming, while the light diffusion section 15 is formed by the plurality of convex surfaces, when the light diffusion section 15 is formed by a method other than the mold forming, the light diffusion section 15 is not limited to the above-mentioned convex surfaces and, for example, the plurality of concave surfaces may be formed by dimple processing.

In the vehicle lamp 1A of the embodiment, as the light diffusion section 15 is formed, the second light L2 entering the refracting surface 14 (the third light L3) can be diffused throughout in the upward/downward direction (the Z-axis direction) and the leftward/rightward direction (the Y-axis direction).

As described above, in the vehicle lamp 1A of the embodiment, as the light diffusion section 15 diffuses the second light L2 entering the refracting surface 14 (the third light L3) in the upward/downward direction (the Z-axis direction), connection in a boundary between the light distribution pattern P1 for LB and the light distribution pattern P2 for ADB can be improved. In addition, connection between the first light L1 and the second light L2 passing through the lower region E1 and the upper region E2 of the projection lens 6 and the third light L3 passing through the intermediate region E3 of the projection lens 6 can be improved to obtain the light distribution patterns P1 and P2 having satisfactory quality.

In addition, in the vehicle lamp 1A, as the light diffusion section 15 diffuses the second light L2 entering the refracting surface 14 (the third light L3) in the leftward/rightward direction (the Y-axis direction), even when the light diffusion section 15 is not provided, it is possible to improve the connection of each of the segments (regions in which light emitted from each of the light emitting elements are radiated) in the widthwise direction (the Y-axis direction) of the light distribution pattern P2 for ADB.

Further, in the embodiment, although the configuration in which the second light L2 entering the refracting surface 14 (the third light L3) is diffused in the leftward/rightward direction (the Y-axis direction) and the upward/downward direction (the Z-axis direction) by the light diffusion section 15 is provided, the embodiment is not limited to the above-mentioned configuration. In some cases, a configuration in which the light diffusion section 15 diffuses the second light L2 entering the refracting surface 14 (the third light L3) only in the upward/downward direction (the Z-axis direction) or a configuration in which the light diffusion section 15 diffuses the second light L2 entering the refracting surface 14 (the third light L3) only in the leftward/rightward direction (the Y-axis direction) may be provided.

In addition, the light diffusion section 15 may be formed not only the refracting surface 14 but also throughout the front surface 10a of the first lens 10. When the light diffusion section 15 is formed on the front surface 10a of the first lens 10, the light diffusion section 15 mainly has an effect of fading the cutoff line CL in the light distribution pattern P1 for LB. For this reason, it is possible to further improve the connection between the light distribution pattern P1 for LB and the light distribution pattern P2 for ADB.

Third Embodiment

Figure 7:
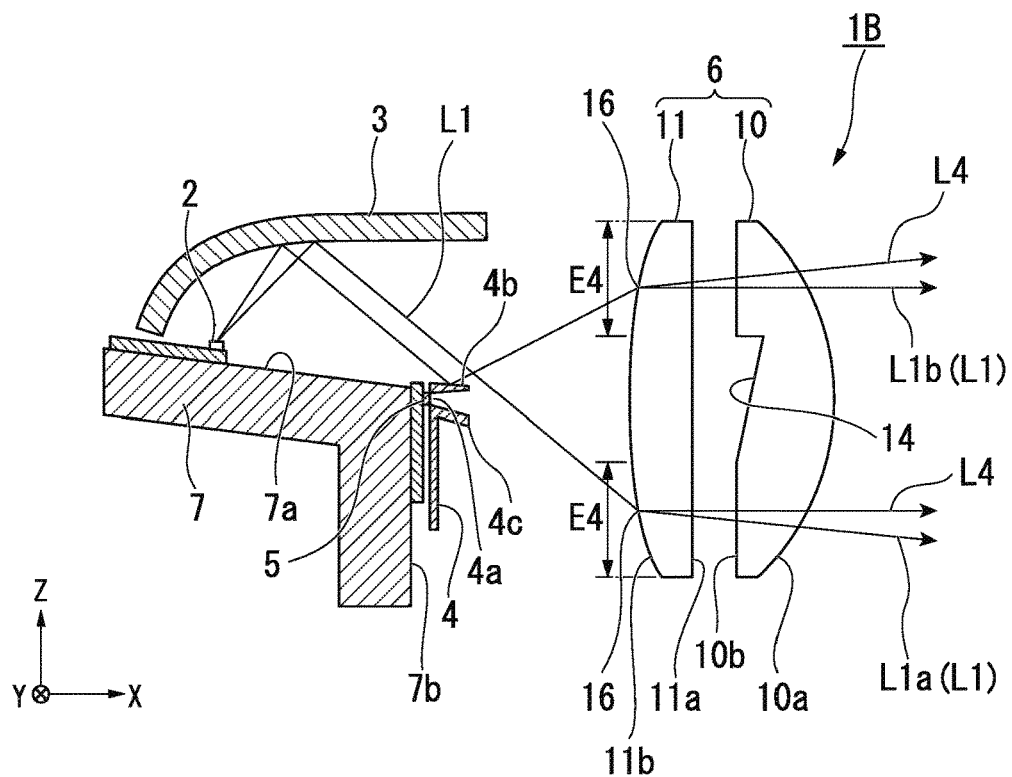
FIG. 7 is a cross-sectional view showing a configuration of a vehicle lamp according to a third embodiment of the present invention.
Figure 8:
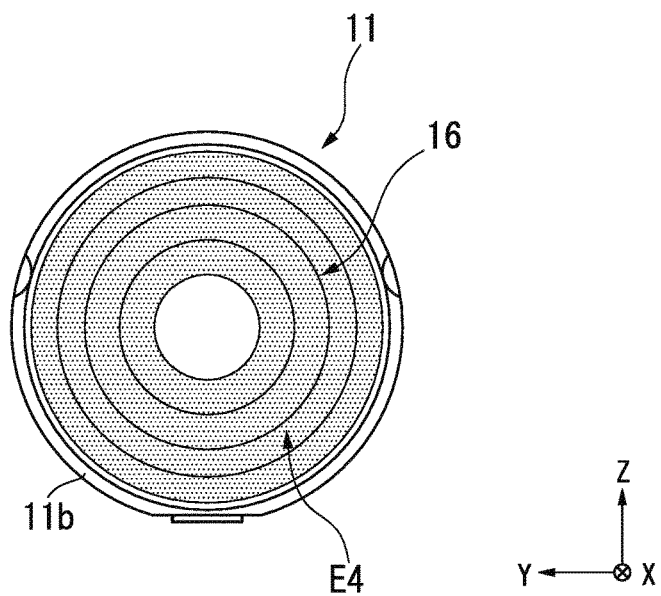
FIG. 8 is a front view showing a second lens included in the vehicle lamp shown in FIG. 7 when seen in a rear view.
Figure 9:
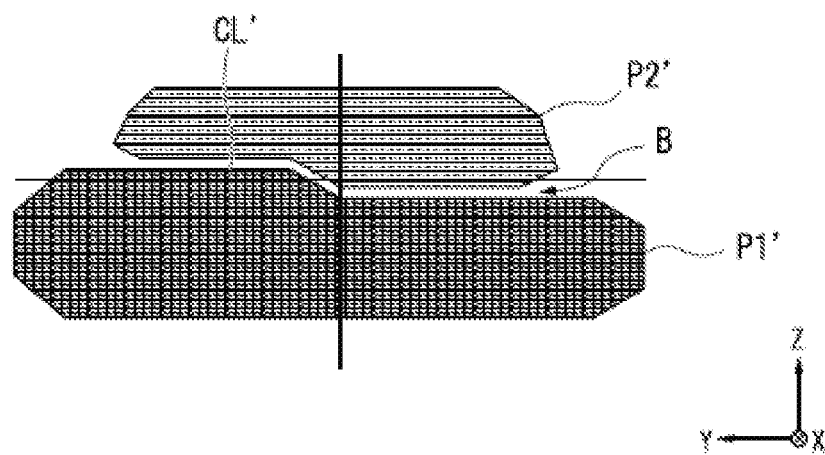
FIG. 9 is a schematic view showing a state in which a dark region is generated between a light distribution pattern for a low beam and a light distribution pattern for a high beam in a vehicle lamp in the related art.

Subsequently, for example, a vehicle lamp 1B shown in FIG. 7 and FIG. 8 will be described as a third embodiment of the present invention. Further, FIG. 7 is a cross-sectional view showing a configuration of the vehicle lamp 1B. FIG. 8 is a front view showing the second lens 11 when seen from the rear surface 11b side. In addition, in the following description, the same parts as in the vehicle lamp 1 are designated by the same reference numerals in the drawings, and description thereof will be omitted.

The vehicle lamp 1B of the embodiment has a configuration in which a diffracting surface 16 configured to diffract some of the first light L1 (hereinafter, referred to as fourth light L4) upward than the optical axis of the first light L1 is provided, in addition to the configuration of the vehicle lamp 1 (or the vehicle lamp 1A). Specifically, the diffracting surface 16 is disposed in a peripheral region E4 of the rear surface 11b of the second lens 11 other than a center thereof. The diffracting surface 16 is constituted by a diffractive optical element (DOE) formed in the peripheral region E4.

In the case of the configuration, a light distribution pattern for overhead (OH) (a third light distribution pattern) can be formed above the cutoff line CL by the fourth light L4 diffracted upward by the diffracting surface 16 among the first light L1.

In addition, a quantity of light of the fourth light L4 that forms the light distribution pattern for OH can be adjusted by varying a proportion of the DOE (the diffracting surface 16) disposed in the peripheral region E4. That is, when the proportion of the DOE (the diffracting surface 16) disposed in the peripheral region E4 is increased, a quantity of light of the fourth light L4 can be relatively increased, whereas, when the proportion is decreased, a quantity of light of the fourth light L4 can be relatively decreased.

Further, when the diffracting surface 16 is formed, it is possible to reduce the color irregularity (chromatic aberration) generated in the widthwise direction (the Y-axis direction) of each of the segments of the light distribution pattern P2 for ADB.

Further, the present invention is not necessarily limited to the first to third embodiments but various modifications may be made without departing from the scope of the present invention.

For example, in the vehicle lamp 1, 1A or 1B, while the configuration in which the light source unit 5 for ADB is used as the second light source is provided, there is no limitation to the light source unit 5 for ADB and a light source unit for a high beam (HB) configured to emit a conventional driving beam (high beam) may be used as the second light source.

In addition, while the projection lens 6 is constituted by a compound lens in which the two lenses (the first lens 10 and the second lens 11) are combined, the number of the combined lenses can be further increased. Meanwhile, the number of lenses that constitute the projection lens 6 can also be reduced using an aspheric lens or the like (in some cases, one lens is provided).

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle lamp comprising:
a first light source configured to emit first light;
a first reflective member configured to reflect the first light downward with respect to a vehicle advancing direction;
a second reflective member configured to reflect some of the first light reflected by the first reflective member upward with respect to the vehicle advancing direction;
a second light source disposed below the second reflective member and configured to emit second light in the vehicle advancing direction; and
a projection lens configured to project the first light and the second light in the vehicle advancing direction,
wherein the projection lens has at least a first lens, and the first lens has at a rear surface thereof a refracting surface configured to refract at least some of the second light downward than an optical axis of the second light,
the refracting surface is formed as a forwardly inclined surface by cutting out a portion of the rear surface of the first lens,
the first light projected by the projection lens forms a first light distribution pattern including a cutoff line defined by a front end of the second reflective member at an upper end of the first light distribution pattern, and
the second light projected by the projection lens forms a second light distribution pattern that is disposed above the first light distribution pattern and that partially overlaps the cutoff line due to the light refracted downward by the refracting surface.

2. The vehicle lamp according to claim 1,
wherein, among the projection lens, the refracting surface is disposed in an intermediate region between a lower region in which first light reflected downward with respect to the vehicle advancing direction by the first reflective member passes and an upper region in which first light reflected upward with respect to the vehicle advancing direction by the second reflective member passes.

3. The vehicle lamp according to claim 1,
wherein the projection lens has a light diffusion section configured to diffuse light entering the refracting surface.

4. The vehicle lamp according to claim 1,
wherein the projection lens has a diffracting surface configured to diffract at least some of the first light upward than the optical axis of the first light, and
the light diffracted by the diffracting surface forms a third light distribution pattern above the cutoff line.

5. The vehicle lamp according to claim 4,
wherein the diffracting surface is disposed in a peripheral region of the projection lens other than a center of the projection lens.
6. The vehicle lamp according to claim 4,
wherein the projection lens has a configuration in which the first lens including the refracting surface and a second lens including the diffracting surface are sequentially disposed in parallel in a direction opposite to the vehicle advancing direction.
7. The vehicle lamp according to claim 1,
wherein the second light source has a plurality of light emitting elements, and
a light distribution of the second light distribution pattern is variably controlled by switching lighting of the plurality of light emitting elements.

\* \* \* \* \*